United States Patent
Mindl et al.

(10) Patent No.: US 6,841,767 B2
(45) Date of Patent: Jan. 11, 2005

(54) DEVICE FOR DETECTING OBJECTS ON A WINDSCREEN OF A MOTOR VEHICLE

(75) Inventors: Anton Mindl, Ludenscheid (DE); Frank Blasing, Werl (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 472 days.

(21) Appl. No.: 09/947,663

(22) Filed: Sep. 6, 2001

(65) Prior Publication Data
US 2002/0047898 A1 Apr. 25, 2002

Related U.S. Application Data

(63) Continuation of application No. PCT/EP00/00181, filed on Jan. 13, 2000.

(30) Foreign Application Priority Data

Mar. 6, 1999 (DE) .......................................... 199 09 987

(51) Int. Cl.$^7$ ............................................. H01L 27/00
(52) U.S. Cl. .................................... 250/208.1; 250/574
(58) Field of Search .................... 250/227.25, 573–575, 250/445, 208.1; 356/335–337, 72–73; 340/601, 603, 604

(56) References Cited

U.S. PATENT DOCUMENTS 5,661,303 A   8/1997 Teder
5,923,027 A * 7/1999 Stam et al. ............... 250/208.1
6,207,967 B1 * 3/2001 Hochstein ................... 250/574

FOREIGN PATENT DOCUMENTS

| EP | 0513476 A1 | 11/1992 |
| EP | 0551984 A1 | 7/1993 |
| EP | 0832798 A2 | 4/1998 |

* cited by examiner

*Primary Examiner*—Thanh X. Luu
*Assistant Examiner*—Seung C. Sohn
(74) *Attorney, Agent, or Firm*—Brooks Kushman P.C.

(57) ABSTRACT

A device for detecting objects on a windshield of a motor vehicle having a hood includes an imaging unit having a lens and a sensor positioned within the interior of the motor vehicle. The lens images a windshield section associated with a primary field of vision onto the sensor. The sensor generates a sensor signal in response to the windshield section imaged thereon. The imaging unit is positioned in a viewing direction pointing diagonally downwards with respect to the windshield such that the background of the windshield section imaged onto the sensor is the hood of the motor vehicle thereby causing the background of the windshield section imaged onto the sensor to be approximately constant in order to cancel environmental conditions that can impair object detection on the windshield section. An evaluation unit evaluates the sensor signal to detect objects on the windshield section.

18 Claims, 2 Drawing Sheets

DEVICE FOR DETECTING OBJECTS ON A WINDSCREEN OF A MOTOR VEHICLE

CROSS-REFERENCE TO RELATED APPLICATIONS

This is a continuation of International Application PCT/EP00/00181, published in German, with an international filing date of Jan. 13, 2000.

BACKGROUND OF THE INVENTION

1. Field of the Invention

The present invention generally relates to a device for detecting objects on a windshield of a motor vehicle. More particularly, the present invention relates to a device for detecting objects on a motor vehicle windshield having an imaging unit with an optoelectronic sensor array and a lens that images a windshield section on a photosensitive surface of the sensor array and that is focused on this windshield section. Such a device also including an evaluation unit that receives electrical signals generated by the sensor array for evaluating the windshield section imaged on the photosensitive surface of the sensor array.

2. Background Art

Such a detection device, which is also designated as a rain sensor, is known from EP 0 832 798 A2. This known detection device includes an imaging unit for imaging water drops on the windshield of a motor vehicle on a camera sensor, whose lens is pointed towards the windshield from the interior of the motor vehicle and is focused on the detected windshield section. The camera sensor is arranged looking forwards in the travel direction in the region of the interior rearview mirror. The detected image data is evaluated by an evaluation unit that also controls a wiper motor as a function of the detected image data.

This detection device further comprises a transparent film that is used as a focusing screen and that is pasted onto the surface of the windshield in the region of the windshield section detected by the imaging unit. The transparent film is used for an improved image of raindrops by canceling out a background image on the photosensitive surface of the camera sensor. Due to the required use of such a transparent film, the imaging unit of this detection device can only be pointed towards such windshield sections associated with the secondary field of vision of the driver or the passenger. As is the case here, looking at the secondary field of vision can be used, in general, to represent the viewing conditions in the primary field of vision of the driver and passenger, e.g., for a windshield covered by rain. However, water drops can appear on the windshield of a motor vehicle only in certain parts of the windshield, e.g., in the primary field of vision of the driver. Such selective windshield coverings can occur, e.g., when single water drops fall from a tunnel ceiling while driving through a tunnel. In general, non-uniform interference of the field of vision is also the rule for dirty windshields.

In the features of separate windshield wiper motor control for the driver and passenger sides, detecting a windshield section in a common secondary field of vision for both fields of vision is also not sufficient.

SUMMARY OF THE INVENTION

Starting with this discussed state of the art, the invention is thus based on the object of refining the initially mentioned device for detecting objects on a windshield of a motor vehicle such that a field-of-vision-selective detection of windshield sections, which is in particular also aimed at a primary field of vision, is possible.

This object is realized according to the invention as the device comprises additional imaging units connected to the evaluation unit for the imaging of additional, different windshield sections, wherein at least one imaging unit detects a windshield section associated with a primary field of vision, and the imaging axis of the sensor array of this imaging unit is positioned in a viewing direction pointing diagonally downwards relative to the windshield.

The detecting device according to the invention uses several individual imaging units for imaging different windshield sections. In this way, at least one imaging unit is provided for detecting a section of the primary field of vision of the driver, and advantageously, another imaging unit is provided for imaging the primary field of vision of the passenger. This detection of selected windshield sections permits a corresponding selective evaluation and thus also a selective control of corresponding actuators, e.g., of a wiper motor. This motor is controlled by the evaluation unit when objects adhere to the windshield in the primary field of vision. This is also done when an object impairing the view is present on the windshield, e.g., only in a primary field. Especially advantageous is such an object detection of selected windshield sections with the use of side-independent windshield wiper motors. If there are two wiper motors and dirt is detected, e.g., only in the primary field of vision of the driver side, then only this wiper motor must be driven. In comparison, the windshield region associated with the passenger is not wiped.

The lenses of the individual imaging units are advantageously focused on the detected windshield section such that the windshield section to be imaged is within the depth of field of the object focusing. The desired depth of field can also be achieved by using an aperture inserted before the lens. For canceling out changing environmental conditions that can impair object detection on the windshield, there are at least the imaging units for imaging a windshield section in a primary field of vision, which are positioned in a viewing direction pointing diagonally downwards relative to the windshield. Through the downwards viewing direction, the background of the image imaged on the sensor array is approximately constant, because at such a viewing angle, the imaged background is the top side of the motor hood, as a rule. Changes due to the motor vehicle environment are detected, if necessary, in the form of differences in brightness of this background and do not impair an exact and reliable object detection on the windshield. A corresponding method applies to motor vehicles that do not have a motor hood that projects forwards, because for these types of vehicles, the dark, top road surface is used as the background of the objects imaged by the imaging units. It should be noted that these background regions are not in the depth of field, and thus, in any case, only form very blurry images. A use of an additional optical coating for canceling out environmental effects is basically not necessary for such an alignment of an imaging unit.

It is advantageous to combine the individual imaging units into one discrete unit as a detection module in the motor vehicle, wherein preferably three imaging units are provided. Such a device can be provided, e.g., in the region of the rearview mirror or integrated into a ceiling module. Thus, it is possible to allocate individual lenses and individual sensor arrays to each imaging unit. Likewise, the individual imaging units or even all of the imaging units can have their own lens, wherein these lenses, however, illuminate a single, common sensor array. In such a configuration, it is possible that the individual imaging units illuminate different regions of the sensor array or also at least partially the same sensor array regions. This device guarantees, to a high degree, an especially efficient use of resources. By illuminating the same sensor array regions by several imaging units, a diaphragm unit that is electrically controlled by means of an electrooptical effect is turned on in the beam path of each imaging unit. Such a diaphragm unit is used to control the illumination of the photosensitive surface of the sensor array through each imaging unit, and this control is also done by the evaluation unit. The control of the diaphragm unit of each imaging unit can be clocked or also performed as a function of predefined conditions. Such a diaphragm unit can be designed, e.g., as a liquid-crystal shutter or it can function according to an electrochemical principle.

Also, in the features of the device according to the invention of an imaging unit that images a windshield section of a primary field of vision, when the detection of objects on the windshield is basically possible without interfering background effects, through a suitable arrangement of the photosensitive surface of the sensor array, which represents the image plane, and/or the lens plane of such an imaging unit, a tilting of the object plane towards the plane of the windshield can be achieved. Correspondingly, the depth of field is also aligned so that, as provided in a preferred configuration, the depth of field is arranged approximately parallel to the plane of the windshield. The term imaging axis used in connection with this configuration is defined by the bisector of the detection angle of the lens. Through this possibility of minimizing the depth of field, the background detected by such an imaging unit forms such a blurry image on the sensor array that there is no interference that affects object detection. Further, it is advantageous that due to the possibly small depth of field, the light intensity of the lens, and thus that of the image, is considerably increased. In a configuration of such an imaging unit, it is provided that the tilt of the image plane is in the opposite direction to the tilting of the object plane and that the imaging axis of the lens-sensor a array arrangement corresponds to the optical axis of the lens. With this configuration objects adhering to the windshield can be imaged to a certain extent distorted on the sensor array. However, this is not relevant for object detection. Especially advantageous is an arrangement between the object plane, the lens plane, and the image plane, wherein these three planes define an intersection line. In this configuration, the object plane is in the plane of the windshield, so that in this configuration, the focusing only need have a very small depth of field.

In another configuration of such an imaging unit, the object plane, the lens plane, and the image plane are tilted in the same direction towards the imaging axis of the lens-sensor array arrangement, and advantageously, they are tilted at the same angle. Also in such an arrangement, the object plane is in the plane of the windshield with corresponding tilt of the image plane and lens plane. This configuration achieves an undistorted image of the entire, relevant windshield section.

An advantageous configuration of the invention uses three imaging units, including one imaging unit for detecting a windshield section associated with the primary field of vision of the driver, another imaging unit for detecting a windshield section associated with the primary field of vision of the passenger, and a third imaging unit for detecting the windshield section associated with the secondary field of vision of the driver or passenger. The advantages of the independent detection of a windshield section of the primary field of vision of the driver or passenger have already been described. The alignment of an imaging unit on a secondary field of vision, in particular on a secondary field of vision that is not reached by a wiper, enables the data associated with the windshield section to be used as a reference to the data from the detected primary field of vision section.

The above objects and other objects, features, and advantages of the present invention are readily apparent from the following detailed description when taken in connection with the accompanying drawings.

DETAILED DESCRIPTION OF THE PREFERRED EMBODIMENT(S)

Figure 1:
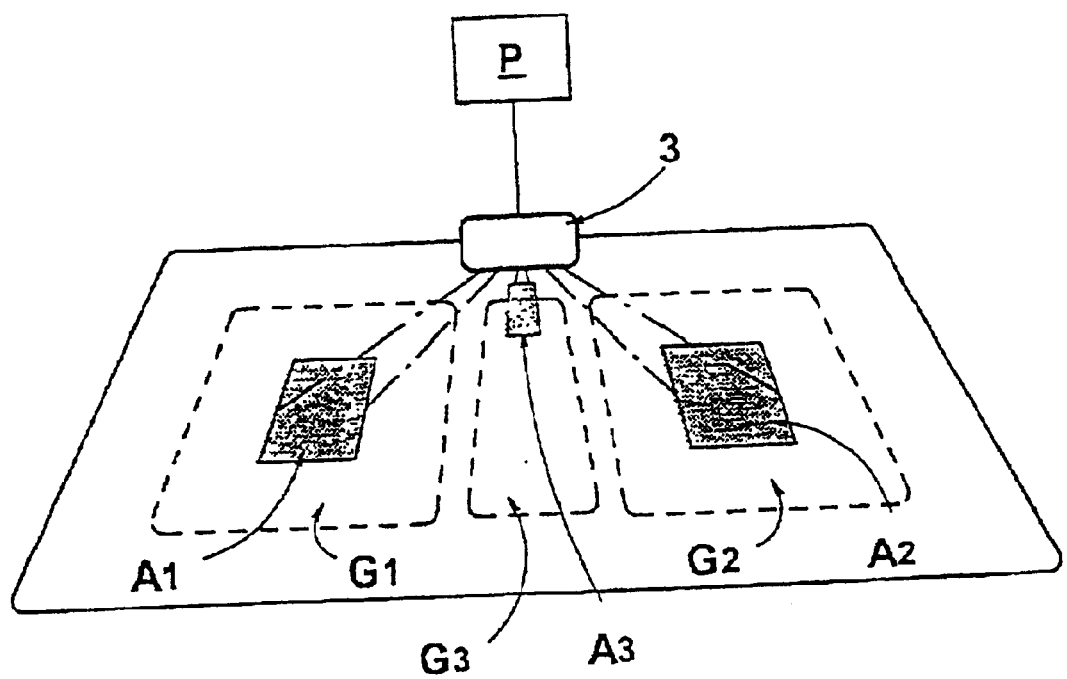
FIG. 1 illustrates a schematic representation of a device for detecting objects on a windshield of a motor vehicle from a viewing direction pointing in the travel direction from the interior of the motor vehicle.

A device 1 for detecting objects on a windshield 2 of a motor vehicle that is not shown in greater detail comprises three imaging units 7, 8, and 9 in a detection module 3. The imaging units are arranged to look at three different windshield sections $A_1$, $A_2$, and $A_3$ of the windshield 2. The viewed windshield sections $A_1$–$A_3$ are components of different fields of vision, wherein the primary field of vision of the driver is designated by the reference symbol $G_1$, that of the passenger is designated by the reference symbol $G_2$, and the secondary field of vision lying between the two fields of vision $G_1$ and $G_2$ is designated by the reference symbol $G_3$. The three imaging units are each arranged to look at a windshield section $A_1$, $A_2$, or $A_3$. The detected windshield section $A_3$ is in a region not wiped by the wiper, so that this windshield section $A_3$ can be used as a reference windshield section for evaluation of the image data obtained from the detection of the windshield sections $A_1$ and $A_2$. By including such a windshield section $A_3$ in the evaluation, the result of wiping in the two additional windshield sections $A_1$ and $A_2$ can be compared with the original state. The lenses 10, 11, and 12 image each windshield section $A_1$, $A_2$, or $A_3$ on the photosensitive surface of a respective sensor portion 13, 14, and 15 of camera sensor 16 that is common to all lenses. In the beam path of each imaging lens, a light switch is turned on, so that the camera sensor can be selectively illuminated by one of the three lenses. A liquid-crystal shutter that is segmented in three parts can be used as the light switch. For evaluating the detected image data and for controlling the light switch, the detection module 3 is connected to a processing unit P.

Figure 2:
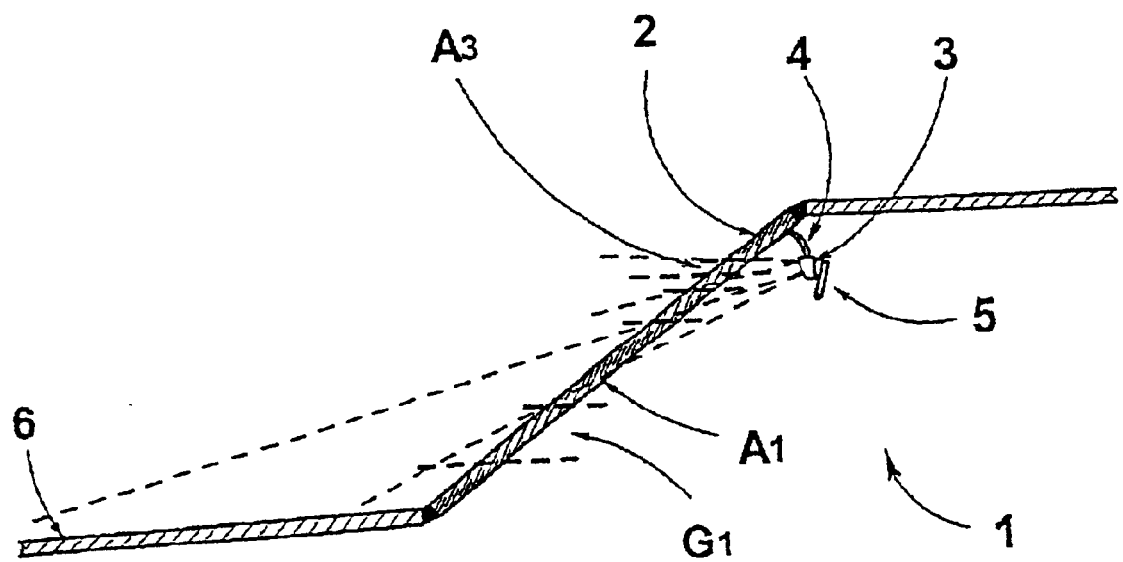
FIG. 2 illustrates a schematic side representation of the device of FIG. 1.
Figure 3:
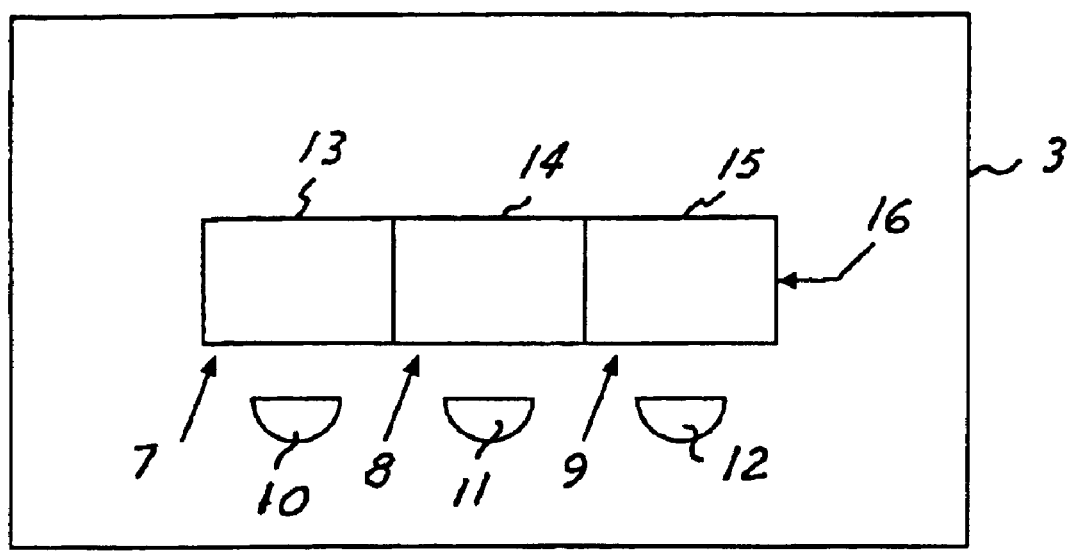
FIG. 3 illustrates an exemplary schematic representation of the detection module of the device of FIG. 1.

As can be seen in FIG. 2, the detection module 3 is integrated in the support 4 of the interior rearview mirror 5. Likewise, the alignment of the imaging unit detecting a windshield section $A_1$ or $A_2$ in a primary field of vision $G_1$ or $G_2$ allows this image to be taken. The detection region of the unit directed onto the primary field of vision of the driver $G_1$ is shown. This imaging unit is positioned in a viewing direction pointing diagonally downwards relative to the windshield section $A_1$ to be detected. The viewing direction of this imaging unit requires that the top side of the motor hood 6 is in the background of the focused windshield section $A_1$. The changing environmental effects due to the motor vehicle motion are thus not found in the field of vision of this imaging unit, so that an object detection that is not influenced by interfering effects is possible on the windshield 2.

Each imaging unit includes an imaging axis defined by the bi-sector of the imaging angle of the lens of the imaging unit. The sensor of each imaging unit is tilted towards the imaging axis of the imaging unit so that windshield sections imaged by the lenses are arranged at an oblique angle with respect to the respective imaging axis.

The detection of the windshield sections $A_1$–$A_3$ can be designed so that both objects on the outside of the windshield 2 and also objects on the inside of the windshield 2 can be detected. Objects on the inside of the windshield 2 can be, e.g., small water droplets due to condensation on the windshield, and this detection can be used to drive a blowing device. Due to the detection of selected windshield sections, the blowing can also be restricted to certain fields of vision.

Thus it is apparent that there has been provided, in accordance with the present invention, a device for detecting objects on a windshield of a motor vehicle that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A device for detecting objects on a windshield of a motor vehicle having a hood, the device comprising:

a first imaging unit having a first lens and a first sensor positioned within the interior of the motor vehicle and away from the windshield, wherein the first lens images a first windshield section associated with a primary field of vision onto the first sensor, wherein the first sensor generates a first sensor signal in response to the first windshield section imaged thereon, wherein the first lens and the first sensor of the first imaging unit are positioned in a viewing direction pointing diagonally downwards with respect to the windshield such that the background of the first windshield section imaged onto the first sensor is the hood of the motor vehicle thereby causing the background of the first windshield section imaged onto the first sensor to be approximately constant in order to cancel environmental conditions that can impair object detection on the first windshield section; and an evaluation unit for evaluating the first sensor signal to detect objects on the first windshield section.

2. The device of claim 1 wherein:

the first imaging unit is integrated into a support of a rear view mirror positioned within the interior of the motor vehicle.

3. The device of claim 1 further comprising:

a second imaging unit having a second lens and a second sensor positioned within the interior of the motor vehicle and away from the windshield, wherein the second lens images a second windshield section associated with a second primary field of vision onto the second sensor, wherein the first and second windshield sections are mutually exclusive from one another, wherein the second sensor generates a second sensor signal in response to the second windshield section imaged thereon, wherein the second lens and the second sensor of the second imaging unit are positioned in a viewing direction pointing diagonally downwards with respect to the windshield such that the background of the second windshield section imaged onto the second sensor is the hood of the motor vehicle;

wherein the evaluation unit evaluates the second sensor signal to detect objects on the second windshield section.

4. The device of claim 3 further comprising:

a third imaging unit having a third lens and a third sensor positioned within the interior of the motor vehicle and away from the windshield, wherein the third lens images a third windshield section associated with a secondary field of vision onto the third sensor, wherein the first, second, and third windshield sections are mutually exclusive from one another, wherein the third sensor generates a third sensor signal in response to the secondary field of vision imaged thereon;

wherein the evaluation unit uses the third sensor signal as a reference for evaluating the first and second sensor signals in order to detect objects on the first and second windshield sections.

5. The device of claim 4 wherein:

the first and second windshield sections are wiped independently as a function of the objects detected on the first and second windshield sections.

6. The device of claim 1 further comprising:

a second imaging unit having a second lens positioned within the interior of the motor vehicle and away from the windshield, wherein the second lens images a second windshield section associated with a second primary field of vision onto the first sensor, wherein the first and second windshield sections are mutually exclusive from one another, wherein the first sensor generates a second sensor signal in response to the second windshield section imaged thereon, wherein the second lens of the second imaging unit is positioned in a viewing direction pointing diagonally downwards with respect to the windshield such that the background of the second windshield section imaged onto the first sensor is the hood of the motor vehicle;

wherein the evaluation unit evaluates the second sensor signal to detect objects on the second windshield section.

7. The device of claim 6 further comprising:

the first and second lenses alternately image the first and second windshield sections onto the first sensor.

8. The device of claim 1 wherein:

the first imaging unit includes an imaging axis defined by the bi-sector of the imaging angle of the first lens, wherein the first sensor is tilted towards the imaging axis of the first imaging unit so that first windshield section imaged by the first lens is arranged at an oblique angle with respect to the imaging axis.

9. A device for detecting objects on a windshield of a motor vehicle, the device comprising:

a first imaging unit having a first lens and a first sensor positioned within the interior of the motor vehicle and away from the windshield, wherein the first lens images a first windshield section associated with a primary field of vision onto the first sensor, wherein the first imaging unit is tilted in a transversely downward directed viewing direction relative to the windshield, wherein the first sensor generates a first sensor signal in response to the first windshield section imaged thereon; and a reference imaging unit positioned within the interior of the motor vehicle and away from the windshield, wherein the reference imaging unit images a reference windshield section associated with a secondary field of vision and generates a reference sensor signal indicative of the imaged reference windshield section, wherein the first and reference windshield sections are different from one another;

an evaluation unit for evaluating the first sensor signal to detect objects on the first windshield section, wherein the evaluation unit uses the reference sensor signal as a reference for evaluating the first sensor signal in order to detect objects on the first windshield section.

10. The device of claim 9 wherein:

the first imaging unit is integrated into a support of a rear view mirror positioned within the interior of the motor vehicle.

11. The device of claim 9 further comprising:

a second imaging unit having a second lens and a second sensor positioned within the interior of the motor vehicle and away from the windshield, wherein the second lens images a second windshield section associated with a second primary field of vision onto the second sensor, wherein the first, second, and reference image sections are different from one another, wherein the second imaging unit is tilted in a transversely downward directed viewing direction relative to the windshield, wherein the second sensor generates a second sensor signal in response to the second windshield section imaged thereon; and wherein the evaluation unit evaluates the second sensor signal to detect objects on the second windshield section.

12. The device of claim 11 wherein the evaluation unit uses the reference sensor signal as a reference for evaluating the first and second sensor signals in order to detect objects on the first and second windshield sections.

13. The device of claim 11 wherein:

the first and second windshield sections are wiped independently as a function of the objects detected on the first and second windshield sections.

14. The device of claim 9 further comprising:

a second imaging unit having a second lens positioned within the interior of the motor vehicle and away from the windshield, wherein the second lens images a second windshield section associated with a second primary field of vision onto the first sensor, wherein the first and second windshield sections are different from one another, wherein the second lens is tilted in a transversely downward directed viewing direction relative to the windshield, wherein the first sensor generates a second sensor signal in response to the second windshield section imaged thereon; and wherein the evaluation unit uses the reference sensor signal as a reference for evaluating the second sensor signal in order to detect objects on the second windshield section.

15. The device of claim 14 wherein:

the first and second lenses alternately image the first and second windshield sections onto the first sensor.

16. The device of claim 9 wherein:

the first imaging unit includes an imaging axis defined by the bi-sector of the imaging angle of the first lens, wherein the first sensor is tilted towards the imaging axis of the first imaging unit so that first windshield section imaged by the first lens is arranged at an oblique angle with respect to the imaging axis.

17. A device for detecting objects on a windshield of a motor vehicle, the device comprising:

a first imaging unit having a first lens and a first sensor positioned within the interior of the motor vehicle and away from the windshield, wherein the first lens images a first windshield section associated with a primary field of vision of a vehicle driver onto the first sensor, wherein the first lens and the first sensor of the first imaging unit are tilted in a transversely downward directed viewing direction relative to the windshield, wherein the first sensor generates a first sensor signal in response to the first windshield section imaged thereon;

a second imaging unit having a second lens and a second sensor positioned within the interior of the motor vehicle and away from the windshield, wherein the second lens images a second windshield section associated with a primary field of vision of a vehicle passenger onto the second sensor, wherein the first and second windshield sections are mutually exclusive from one another, wherein the second lens and the second sensor of the second imaging unit are tilted in a transversely downward directed viewing direction relative to the windshield, wherein the second sensor generates a second sensor signal in response to the second windshield section imaged thereon; and an evaluation unit for evaluating the first and second sensor signals to detect objects on the first and second windshield sections.

18. The device of claim 17 further comprising:

a third imaging unit having a third lens and a third sensor positioned within the interior of the motor vehicle and away from the windshield, wherein the third lens images a third windshield section associated with a secondary field of vision onto the third sensor, wherein the first, second, and third windshield sections are mutually exclusive from one another, wherein the third sensor generates a third sensor signal in response to the secondary field of vision imaged thereon;

wherein the evaluation unit uses the third sensor signal as a reference for evaluating the first and second sensor signals in order to detect objects on the first and second windshield sections.

* * * * *